US012559161B2

(12) United States Patent
Heitmann et al.

(10) Patent No.: US 12,559,161 B2
(45) Date of Patent: Feb. 24, 2026

(54) STEERING INPUT DEVICE

(71) Applicant: Arnold NextG GmbH, Pfronstetten (DE)

(72) Inventors: Andreas Heitmann, Ruesselsheim (DE); Danijel Andrijic, Albstadt (DE)

(73) Assignee: Arnold NextG GmbH, Pfronstetten (DE)

(*) Notice: Subject to any disclaimer, the term of this patent is extended or adjusted under 35 U.S.C. 154(b) by 486 days.

(21) Appl. No.: 18/197,776

(22) Filed: May 16, 2023

(65) Prior Publication Data

US 2023/0373556 A1      Nov. 23, 2023

(30) Foreign Application Priority Data

May 19, 2022     (EP) .................................... 22174407

(51) Int. Cl.
   *G01L 3/10*       (2006.01)
   *B62D 5/00*       (2006.01)
(52) U.S. Cl.
   CPC .................................. *B62D 5/006* (2013.01)
(58) Field of Classification Search
   CPC .. B62D 5/006; B62D 5/0469; B62D 15/0215; G01L 3/104
   See application file for complete search history.

(56) References Cited

U.S. PATENT DOCUMENTS

| | | | | |
|---|---|---|---|---|
| 4,727,950 | A | * | 3/1988 | Shimizu ............... B62D 5/0469 |
| | | | | 180/446 |
| 4,784,002 | A | * | 11/1988 | Lo ........................... G01L 3/104 |
| | | | | 324/207.13 |
| 2004/0238258 | A1 | | 12/2004 | Ono et al. |
| 2016/0179128 | A1 | | 6/2016 | Guglielmo |

FOREIGN PATENT DOCUMENTS

| | | |
|---|---|---|
| DE | 10 2005 030 259 A1 | 1/2007 |
| DE | 10 2019 109 886 A1 | 10/2020 |
| DE | 10 2019 120 874 A1 | 2/2021 |
| EP | 1 598 726 A2 | 11/2005 |
| EP | 1 954 547 B1 | 9/2009 |
| EP | 3 712 034 A1 | 9/2020 |

* cited by examiner

*Primary Examiner* — Cortez M Cook
(74) *Attorney, Agent, or Firm* — Collard & Roe, P.C.

(57) ABSTRACT

A steering input device for electronically controlled elements of machines, vehicles, aircraft or ships, includes a manually operable operating element connected to an input shaft, and a feedback motor having an output shaft, wherein a first angle sensor is provided whose output signal indicates the angular position of the output shaft, and a second angle sensor whose output signal indicates the angular position of the input shaft. The motor output shaft is rotatably connected to the input shaft via at least one elastic member so that an elastic deformation occurs in the elastic member when a torque is applied to one of the shafts, and the resulting angular displacement between the two shafts is measured by the two angle sensors.

8 Claims, 2 Drawing Sheets

STEERING INPUT DEVICE

CROSS REFERENCE TO RELATED APPLICATION

Applicant claims priority under 35 U.S.C. § 119 of European Application No. 22174407.1 filed May 19, 2022, the disclosure of which is incorporated by reference.

BACKGROUND OF THE INVENTION

1. Field of the Invention

In steer-by-wire systems in vehicles, it is desirable to provide the same accuracy and comfort as vehicles with a steering column and EPS. Most of the known steer-by-wire systems control an element either by applying a torque or by the input of a desired position, usually the angle of the element to be controlled.

In systems where a torque is applied to control an element, the steering input devices rely on sensing an input torque or force applied by an operator to an operating element and providing an output force through an actuator to a controlled element, such as a wheel. When the controlled element moves in response to the resultant active force, which is the sum of the output force and the external forces acting on the controlled element, a position sensor transmits the resultant movement to a controller, which controls an actuator that triggers a corresponding movement on the operating element. As a result, the operator experiences a reaction force that corresponds to the external forces acting on the controlled element. Such systems require a steering input device capable of measuring a force input and allowing the controller to control the position of the element.

Control systems in which input of a desired position of an element is used to control the position of that element generate feedback to the operator by applying a force to the operating element. The latter system requires a steering input device that allows the operator to change the position of an operating element and a control device that can apply a force to the operating element through an actuator.

Depending on the application, a system with force input on an operating element or a system with position input of the element to be controlled may be preferable. Hybrid solutions are also possible for some applications. Fly-by-wire control of a commercial aircraft using a control stick is an example of an application where a hybrid solution is preferable. Fly-by-wire systems typically use position inputs for the elements being controlled and in some cases provide force feedback to a control stick. Commercial aircraft are flown by two pilots, each with a control stick, with the two sticks operating independently so that the two sticks can be operated in conflict. Pilots switch control from one stick to the other, which means that the other pilot does not receive feedback when one pilot is in control. Also, in some flight control systems, the flight control computer may switch the active control stick from one pilot to the other if the computer considers the steering inputs of the non-controlling pilot to be a more appropriate response to a particular situation than the steering inputs of the controlling pilot. This can cause confusion between pilots if they miss the visual indication of who is in control. A system where the active stick operates in position input mode and the non-active stick operates in position feedback mode would allow the non-active pilot to sense what the controlling pilot is doing. By introducing a force threshold, control can be taken over by the non-active pilot if the non-active pilot applies a significant force to override the active pilot's input. In the event that the flight control computer overrides the pilot's input, both control sticks could be switched to position feedback, and the controlling pilot would know immediately when the flight control computer overrides its input.

The same applies to vehicles with steer-by-wire systems, where automatic driving assistance systems can temporarily take over control, or when switching to autonomous driving.

Vehicles equipped with two steering wheels for driver training would also benefit from a hybrid system in which the student driver operates the car through position control and force feedback, while the instructor can sense these control inputs through position feedback. If the instructor sees the need to intervene and exceeds a threshold force on the instructor steering wheel, control of the car is shifted to the instructor steering wheel and the instructor takes control with position control and force feedback on his steering wheel, while the student driver can now feel the instructor's control inputs through position feedback in the student steering wheel.

2. Description of the Related Art

However, no solution is known from the prior art for a steering input device that can operate in both force input/position feedback mode and position input/force feedback mode.

From European Patent Application No. EP 3 712 034 A1, a work vehicle is known which comprises a hydraulic actuator, an actual steering angle detecting part, and an operating unit. The operating unit in a wheel loader includes a joystick lever, a support part, a base plate, a biasing part, and a position adjusting part. The biasing part biases the joystick lever to a predetermined position with respect to the base plate. The position adjusting part adjusts the rotation angle of the base plate with respect to the support part. A lever absolute angle sensor, a base plate angle sensor, and a second computing part detect a detection value $\theta d$ of a lever relative angle of the joystick lever with respect to the base plate. A motor drive control part sets a torque base on the detection value $\theta d$ detect of the lever relative angle and uses the torque to control the position adjusting part 45 on the detection value $\theta d$ detect of the vehicle body frame angle.

European Patent No. EP 1 954 547 B1 shows a steering input device suitable for receiving a force input from an operator to an operating element and providing the operator with a position feedback of the element to be controlled. However, the proposed solution is not suitable for operation based on a position input and a force feedback because a self-locking gear between the actuator for the element to be controlled and the operating element prevents the operator from making a position input.

From European Patent Application No. EP 1 598 726 A2, an input device is known that allows position input and provides force feedback to the operator. However, this solution is not designed to provide the force feedback required in cars, aircraft and heavy machinery. The problem of motor ripple and inertia is also not addressed.

US Patent Application Publication No. 2016/179128 A1 discloses a joystick for controlling the speed of driven machine elements. A position detection system is provided that is capable of detecting the position of the joystick handle at a given time and using this information to control the speed or position of an element by a control unit and an actuator that operates the controlled element. A first feedback unit is capable of causing the joystick to vibrate when pre-programmed trigger events occur. A second feedback system consists of two motors that actuate two opposing racks connected to the joystick, with a spring between the racks. Although the application mentions the possibility of using the two motors to provide force feedback to the joystick, the primary purpose of the feedback system is to compensate for the neutral position of the joystick, the neutral position being the position to which the joystick returns when the operator is not applying force.

However, this document does not describe that the force applied by the operator is determined and used to control the element.

Another desired feature of steer-by-wire systems is a realistic feedback of road forces to an operating element, for example a steering wheel or a joystick. For this purpose, a force feedback actuator must be provided, that generates a considerable force and transmits it to the operating element.

In principle, DC electric motors that provide sufficient torque for a direct drive can be used as force feedback actuators. However, these motors require a large installation space and are expensive. In addition, DC motors are usually designed to provide uniform torque during rotation, but not uniform torque during small angular movements. As a result, commercial motors deliver only a fraction of their nominal torque when not rotating, and exhibit significant torque variations (ripple) during very small movements and at low speeds. A high ratio gear could reduce the ripple and increase the speed and angular movement of the motor, but this would add significant inertia to the steering input device.

Stepper motors are designed to move in small steps and can be controlled very precisely in terms of both speed and position, but not in terms of torque. Because the stepper motor is designed to move in small specific steps, this type of motor also provides significant torque ripple.

SUMMARY OF THE INVENTION

Therefore, the objective of the invention is to provide a solution for a steering input device that can operate in both modes: force or torque input/position feedback mode and position input/force feedback mode, and that avoids ripple effects in the feedback force.

The problem is solved by a steering input device for electronically controlled elements of vehicles, aircrafts, ships or machines, having an operating element which is to be operated manually and is connected to an input shaft, and having a feedback motor with an output shaft, a first angle sensor whose output signal indicates the angular position of the output shaft, and a second angle sensor whose output signal indicates the angular position of the input shaft. The motor output shaft is rotatably connected to the input shaft via at least one elastic element, so that an elastic deformation occurs in the elastic element when a torque is applied to one of the shafts, and the resulting angular displacement between the two shafts is measured by the two angle sensors. At least one strain gauge is attached to the input shaft.

The steering input device according to the invention can be operated in both modes. It can be used to apply a force on the element to be controlled or the desired angular position of the element can be specified. Furthermore, the input device avoids the need for bulky motors because a quick provision of torque does not require a high torque from low or zero angular speed, as the motor will be allowed to move at high speed to increase the angular difference. This effect can be enhanced by providing a gear. A gear is amplifying both the torque and the movement of the motor itself. At the same time, the at least one elastic element will allow a little spring loaded slack if the user applies a sudden steering correction to the input device, reducing the impact of high inertia resulting from the gear.

The input device according to the invention balances between the need for a bulky, expensive DC-motor and a stepper motor that has significant ripple and poor torque control options. The input device uses only position control for the motor and no torque control and therefore avoids problems with ripple effects. The ripple effect is reduced for all kinds of electric motors used as a feedback motor If a hydraulic motor is used problems with ripple effects can be avoided completely.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 2:
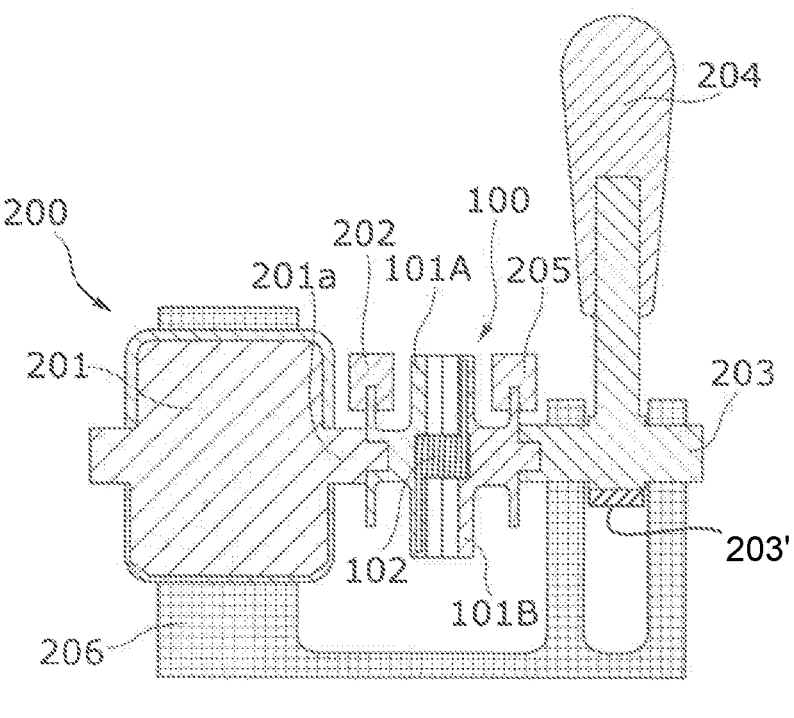
FIG. 2 is a cross-section through a steering input device.

The steering input device 200 according to the invention, which is shown in FIG. 2, comprises an operating element 204—in this case a joystick—with which an operator can exert control inputs for an element to be controlled (not shown) and via which he can receive feedback signals from the controlled element. The operating element 204 is connected to an input shaft 203, so that movement of the operating element 204 results in a corresponding movement of the input shaft 203. At least one strain gauge 203' is attached to the input shaft. Further provided is a coupling unit 100 comprising two housing parts 101A, 101B axially connected such that each part 101A, 101B can rotate relative to the other. The coupling unit 100 has an elastic member in the form of a torsion spring member 102, the ends of the spring member 102 each being rotatably mounted in a groove in one of the housing parts 101A,101B. The housing part 101B of the coupling unit 100 is rotationally fixed to the input shaft 203. The opposite housing part 101A of the coupling unit 100 is non-rotatably connected to the output shaft 201a of a feedback motor 201.

A first angle sensor 202 measures the angular position θ1 of the motor output shaft 201a. The first angle sensor may be an external angle sensor or an angle sensor built into the motor 201. A second angle sensor 205 measures the angular position θ2 of the input shaft 203.

When no torque is transmitted through the coupling unit 100, the angular position $\theta_1$ of the motor output shaft 201a corresponds to the angular position $\theta_2$ of the input shaft 203.

On the other hand, when a torque T is transmitted through the coupling unit 100, the elastic deformation of the spring element 102 results in an angular displacement between the two shafts 202a and 203 of $\Delta \theta = T/k$, where k is the spring constant. The angular displacement can be determined as $\Delta \theta = \theta_2 - \theta_1$ using the angular sensors 202, 205.

Since there is a relationship between the angular displacement $\Delta \theta$ and the torque transmitted between the motor output shaft 201a and the input shaft 203, the steering input device 200 can be used to determine a torque from a given angular displacement $\Delta$ $\theta$ or to obtain torque feedback at the operating element 204 by applying a presettable angular displacement $\Delta$ $\theta$.

The distinguishing feature of the steering input device according to the invention is the implementation of an elastic element 102 between an operating element 204 and a feedback motor 201, combined with a first angle sensor measuring the angular position of the output shaft of the feedback motor and a second angle sensor measuring the angular position of the input shaft. This allows to operate the steering input device in both modes: force input/position feedback mode and position input/force feedback mode. Further, ripple effects in the feedback force created by the motor 201 can be avoided. The motor 201 can be an electric motor or a hydraulic motor.

Figures 1A, 1B, 1C, 1D, 1E:
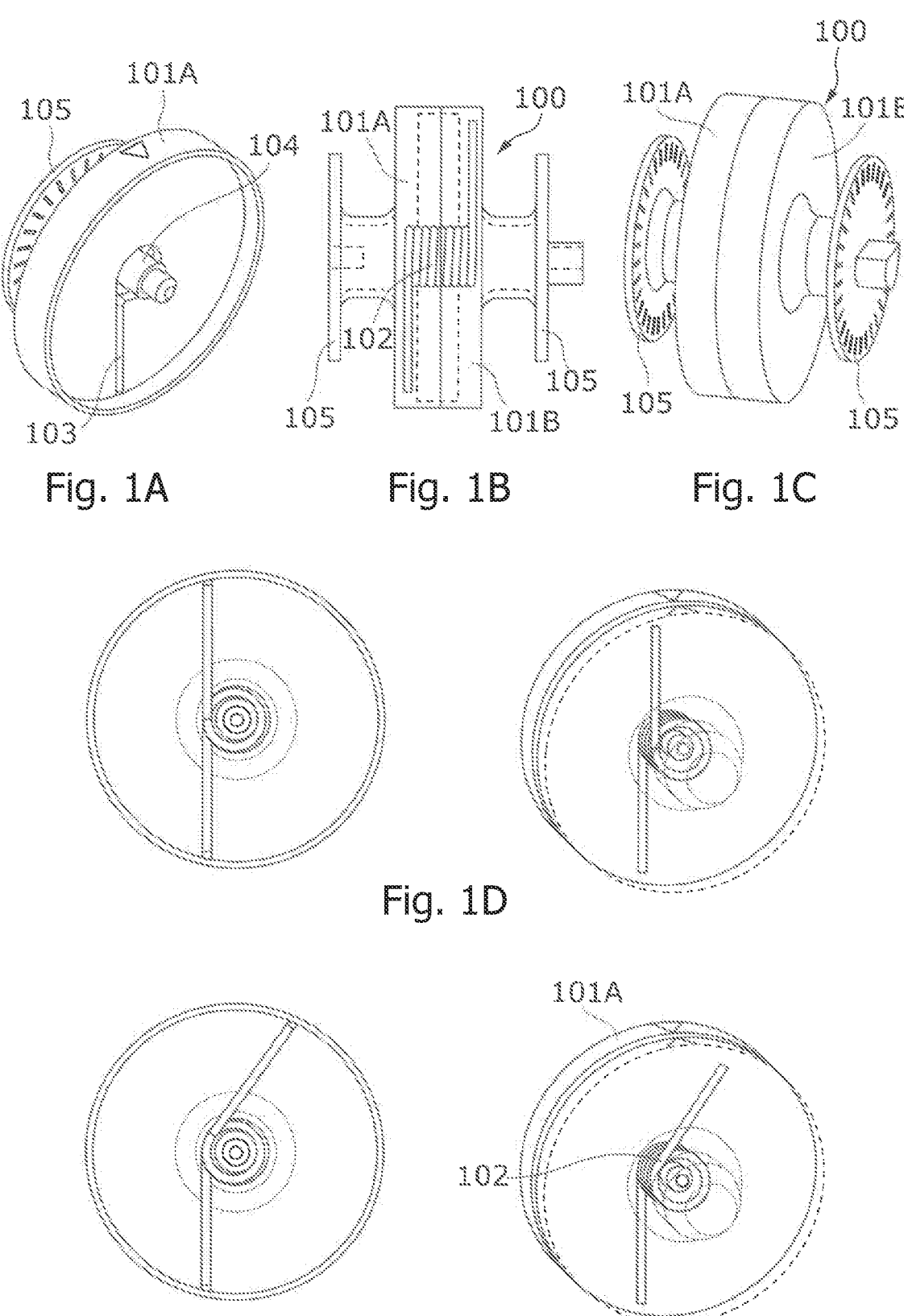
FIGS. 1A to 1E are various detailed views of elements of a coupling unit of the steering input device shown in FIG. 2.

FIGS. 1A to 1E show the individual components of the coupling unit 100. The coupling unit 100 consists of the two housing parts 101A, 101B. FIG. 1A shows the internal details of the housing part 101A. A protrusion 104 provides axial alignment with the housing part 101B, ensuring adequate spacing between the two and centering of the spring element 102. The protrusion 104 may have a smaller protrusion that engages a recess on the opposite housing part 101B, or both protrusions may be in the form of a cylinder that receives a locking and alignment pin.

A groove 103 is provided in both housing parts 101A, 101B, in each of which one end of the spring element 102 is rotatably supported, as shown in FIGS. 1B and 1D. Both housing parts 101A, 101B have shaft extensions on the outside, as shown in FIG. 1C, each of which can be rotationally connected to the motor output shaft 201a and the input shaft 203, respectively. In the illustrated example, the housing parts 101A, 101B each have a disk with hole patterns 105 for use with an optical angle sensor 202, 205.

In FIG. 1E, the housing part 101A facing away from the viewer remains fixed, while the housing part 101B facing the viewer is rotated by $\theta$ degrees. The angular displacement between the two housing parts is given by: $\Delta\theta=\theta_2-\theta_1$, where $\theta_1$ is the rotational position of the housing part 101A and $\theta_2$ is the rotational position of the housing part 101B, measured from a common reference and in a common positive direction. Since the housing part 101A is not rotated, this results in an angular displacement of $\Delta\theta=\theta_2-0=\theta_2$. For a given spring constant of k[Nm/deg] of the spring element 102, the illustrated rotation requires a torque of: $T=\Delta\theta\cdot k=\theta_2\cdot k$.

It is understood that the spring element 102 may be made of metal or a composite material. The spring element 102 may also have a different shape. A rubber part or a part made of a similar elastic material may also be used to achieve the characteristics of a torsion spring element.

Figure 3:
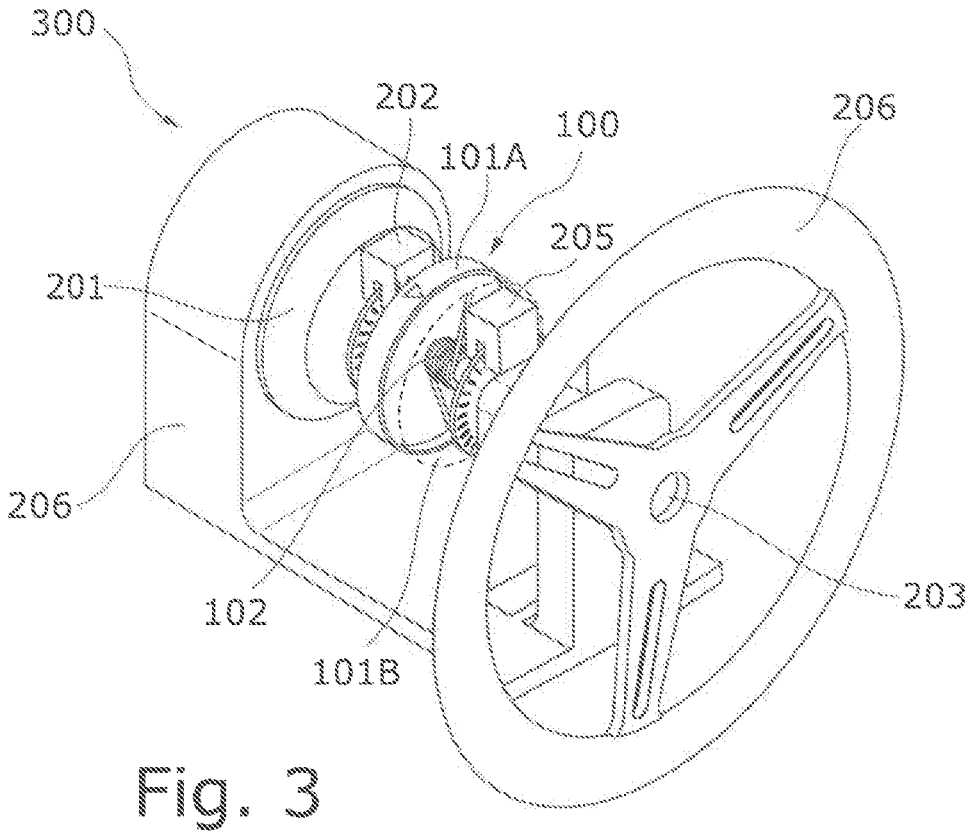
FIG. 3 is a view of a second steering input device with a steering wheel as operating element.

The steering input device 200 according to the invention, shown in FIG. 2, comprises the operating element 204 with which the operator can make inputs and receive feedback. The operating element 204 may be in the form of a joystick, a steering wheel 206 (FIG. 3), or any other form suitable for the control task. The operating element 204 is connected to an input shaft 203, such that movement of the operating element 204 results in corresponding movement of the input shaft 203. In FIG. 2, the input shaft 203 and a portion of the operating element 204 are shown as a common component, but it may also be an assembly comprising multiple elements. A coupling unit 100 comprising two housing parts 101A, 101B is axially connected such that each part 101A, 101B can rotate relative to the other. Each end of a spring element 102 is rotatably fixed in a groove 103 in the housing part 101A, 101B of the respective ends of the spring element 102. One end of the coupling unit 100 is rotationally fixed to the input shaft 203. The housing 101B of the resilient member 102 may be an integral part of the input shaft 203. The opposite end of the coupling unit 100 is rotationally fixed to the output shaft 201a of the motor 201. The housing 101A of the elastic member 102 may be an integral part of the motor output shaft 201a.

A first angle sensor 202 measures the angular position $\theta_1$ of the motor output shaft 201a. The first angle sensor can be an external angle sensor or an angle sensor built into the motor. A second angle sensor 205 measures the angular position $\theta_2$ of the input shaft 203. There is at least one strain gauge 203' attached to the input shaft 203 and/or to the operating element 204.

When no torque is transmitted through the coupling unit 100, the angular position $\theta_1$ of the motor output shaft 201a corresponds to the angular position $\theta_2$ of the input shaft 203. When torque T is transmitted through the coupling unit, elastic deformation of spring 102 results in an angular displacement between the two shafts 202a and 203 of $\Delta$ $\theta=T/k$, where k is the spring constant. The angular displacement can be determined from the inputs of the encoders 202, 205 as $\Delta$ $\theta=\theta_2-\theta_1$.

Thus, the steering input device can be used in a control system that uses position input by measuring the position $\theta_2$ to which the operator moves the operator input shaft 203 over the operating element 204. A controller then controls an actuator that moves the controlled element to a corresponding position. A force feedback may be estimated by the controller. This may be based on measuring the current used by the actuator or measuring the force required. The controller can then calculate a suitable torque T to be applied to the input shaft 203. The desired feedback torque can then be applied by the controller by moving the motor output shaft 201a to an angular position of: $\theta_1=\theta_2-T/k$.

However, the steering input device can also be used in a control system that uses the applied force as a control input parameter and provides position feedback to the operator. In such a system, the operator applies a force to the operating element 204, causing a torque T1 to be applied to the input shaft 203. Since the controlled element does not move, the controller maintains the position $\theta_{21}$ by driving the motor output shaft 201a in the opposite direction so that the position $\theta_{21}$ is maintained. Equilibrium is reached at a motor output shaft position of $\theta_{11}$, and the torque applied by the operator can be calculated as $T1=(\theta_{21}-\theta_{11})\cdot k$, which is used by the controller to apply an appropriate force to the controlled element.

When the operator increases the torque to a value T2 and the controller then applies a corresponding force to the controlled element, the controlled element starts to move. This is detected by an angle sensor on the controlled element and transmitted to the controller. The controller then allows the input shaft 203 of the operating element to move to a position $\theta_{22}$ corresponding to the new position of the controlled element by driving the motor output shaft 201a to the position $\theta_{12}$ given by: $\theta_{12}=\theta_{22}-T2/k$.

It is understood that the loop of transmitting input signals to the controller and receiving feedback signals from the controller is repeated at a high frequency (more than 100 Hz) and therefore the changes in rotational positions and applied forces are incremental and occur in very small steps.

The operating element can be any element suitable to manually control the movement of a part not only a steering wheel or a joystick.

Although only a few embodiments of the present invention have been shown and described, it is to be understood that many changes and modifications may be made thereunto without departing from the spirit and scope of the invention.

What is claimed is:

1. A steering input device for electronically controlled elements of vehicles, aircrafts, ships or machines, comprising:
   an operating element (204) that is configured to be operated manually and is connected to an input shaft (203),
   a feedback motor (201) connected to an output shaft (201a),
   a first angle sensor (202) configured to generate an output signal that indicates an angular position of the output shaft (201a), and
   a second angle sensor (205) configured to generate an output signal that indicates an angular position of the input shaft (203),
   wherein the output shaft (201a/101A) of the feedback motor is rotatably connected to the input shaft (203/101B) via at least one elastic element (102), so that an elastic deformation occurs in the elastic element (102) when a torque is applied to one of the shafts (201a, 203), and a resulting angular displacement between the two shafts (201a, 203) is measured by the first and second angle sensors (202, 205), and wherein at least one strain gauge (203') is attached to the input shaft (203).

2. The steering input device according to claim 1, wherein the elastic element is a torsion spring.

3. The steering input device according to claim 1, wherein the elastic element is a rubber member.

4. The steering input device according to claim 1, wherein the feedback motor is an electric motor.

5. The steering input device according to claim 1, wherein the feedback motor is a hydraulic motor.

6. The steering input device according to claim 1, wherein the operating element is a joystick.

7. The steering input device according to claim 1, wherein the operating element is a steering wheel.

8. The steering input device according to claim 1, wherein the at least one strain gauge is attached to the operating element connected to the input shaft.

\* \* \* \* \*